(12) United States Patent
Kanai et al.

(10) Patent No.: US 6,512,027 B2
(45) Date of Patent: Jan. 28, 2003

(54) POLYESTER RESIN COMPOSITION

(75) Inventors: Hiroyuki Kanai, Fuji (JP); Toru Katsumata, Fuji (JP)

(73) Assignee: Polyplastics Co., Ltd. (JP)

( * ) Notice: Subject to any disclaimer, the term of this patent is extended or adjusted under 35 U.S.C. 154(b) by 0 days.

(21) Appl. No.: 09/533,070

(22) Filed: Mar. 22, 2000

(65) Prior Publication Data

US 2002/0077399 A1 Jun. 20, 2002

(30) Foreign Application Priority Data

Mar. 24, 1999 (JP) ............................. 11-079419
Oct. 29, 1999 (JP) ............................. 11-308736

(51) Int. Cl.$^7$ ..................... C08L 67/02; C08K 3/40; C08K 5/04; C08K 5/10
(52) U.S. Cl. .................. 523/511; 523/522; 523/527; 524/494; 524/504; 524/513
(58) Field of Search ................ 523/511, 522, 523/527; 524/504, 513, 605, 494; 525/78, 82

(56) References Cited

U.S. PATENT DOCUMENTS

| | | | | |
|---|---|---|---|---|
| 3,700,754 A | * | 10/1972 | Schmitt et al. | 525/309 |
| 4,391,938 A | * | 7/1983 | Memon et al. | 524/270 |
| 4,677,148 A | * | 6/1987 | Chung et al. | 524/298 |
| 4,879,328 A | * | 11/1989 | Karasawa et al. | 524/109 |
| 4,939,201 A | * | 7/1990 | Seiler et al. | 524/504 |
| 4,980,109 A | * | 12/1990 | Yamamoto et al. | 264/135 |
| 5,017,650 A | * | 5/1991 | Nakamura et al. | 525/65 |
| 5,300,573 A | * | 4/1994 | Patel | 525/109 |
| 5,321,078 A | * | 6/1994 | Mashita et al. | 525/64 |
| 5,891,943 A | * | 4/1999 | Katsumata et al. | 524/310 |
| 5,967,921 A | * | 10/1999 | Simpson et al. | 474/110 |

FOREIGN PATENT DOCUMENTS

| | | |
|---|---|---|
| JP | B 40 23798 | 10/1940 |
| JP | B 42-8704 | 4/1942 |
| JP | B 43-6636 | 3/1943 |
| JP | B 43-17979 | 7/1943 |
| JP | B 56-28925 | 7/1981 |
| JP | A 59-133203 | 7/1984 |

\* cited by examiner

Primary Examiner—Vasu Jagannathan
Assistant Examiner—Callie E Shosho
(74) Attorney, Agent, or Firm—Nixon & Vanderhye P.C.

(57) ABSTRACT

A thermoplastic resin having such a sufficient heat shock resistance that it is unbroken by common temperature changes when applied to an insert molded article, which is obtained by blending a thermoplastic polyester resin (A) with 1–25% by weight to the total amount of the composition of an impact resistance giving agent (B), 1–50% by weight to the total amount of the composition of an inorganic filler (C) and 0.1–10% by weight to the total amount of the composition of an aromatic polyvalent carboxylate (D).

8 Claims, No Drawings

POLYESTER RESIN COMPOSITION

TECHNICAL FIELD OF THE INVENTION

The present invention relates to a polyester resin composition having excellent heat shock property, and it also relates to an insert molded article having excellent heat shock property obtained by an insert-molding of the polyester resin composition with a metal or an inorganic solid.

BACKGROUND OF THE INVENTION

The insert molding method is a molding method in which a metal or inorganic solid (hereinafter, abbreviated as metals) is embedded in a resin for utilizing the property of the resin and the material property of the metals. It is applied in wide fields such as automobile parts and electric and electronic parts, and presently one of general molding methods. However, since expansion and shrinkage coefficient (so-called liner expansion coefficient) are extremely different between a resin and metals, molded articles having thin resin portions, portions with large variation in thickness or sharp corners composed of metals, suffer from a lot of troubles such as cracking just after molding and cracking by temperature change in use. Therefore, currently, uses and forms of molded articles are extremely restricted.

Recently, formation of parts around an engine with resins is in progress also in the field of the automobile industry, and insert molded articles are used for important parts. Particularly, insert molded articles, prepared by wrapping metal parts made of, for example, aluminum, copper, iron and brass with a thermoplastic polyester resin, are studied for use in parts of the ignition system and distributor. However, these insert molded articles are required having higher abilities because the insert parts have complicated structures, thickness of resins varies in lot of portions, and additionally, temperature change is extremely large because they are used near the engine. Therefore, due to such reasons, resins which can endure change between higher temperature and lower temperature for a long period of time, namely, resins having excellent heat shock property are lately required strongly.

SUMMARY OF THE INVENTION

The present inventors have intensively studied, in view of the above-described problems, to obtain a thermoplastic resin having excellent heat shock property, which can provide such insert molded articles as they do not crack by temperature change. As a result, it has been found that a composition, mainly comprising a thermoplastic polyester resin and containing an impact resistance giving agent, inorganic filler and aromatic ester compound compounded therein, is excellent significantly in heat shock property, and that an insert molded article prepared by using this composition has sufficient heat shock resistance causing no crack by common temperature change, whereby completing the present invention.

That is, an object of the present invention is a polyester resin composition, obtained by blending a thermoplastic polyester resin (A) with 1 to 25% by weight, based on the total amount of the composition, of an impact resistance giving agent (B), 1 to 50% by weight, based on the total amount of the composition, of an inorganic filler (C) and 0.1 to 10% by weight, based on the total amount of the composition, of an aromatic polyvalent carboxylate (D), and an insert molded article obtained by an insert-molding of the polyester resin composition with a metal or an inorganic solid.

In other words, the composition comprises (A), 1 to 25% by weight of (B), 1–50% by weight of (C) and 0.1–10% by weight of (D), which are all based on the total amount of the composition. The amount of (A) may be 15 to 97.9% by weight to 100% by weight of the composition.

DETAILED DESCRIPTION OF THE INVENTION

The present invention will be described in detail below. First, the thermoplastic polyester resin (A), which is a base resin in the present invention, is a polyester obtained by, for example, polycondensation of a dicarboxylic acid compound with a dihydroxy compound, polycondensation of an oxycarboxylic acid compound, and polycondensation of ternary compounds thereof, and may be any of homopolyesters and copolyesters. Examples of the dicarboxylic acid compound constituting the thermoplastic polyester resin (A) herein used include known dicarboxylic acids such as terephthalic acid, isophthalic acid, naphthalene dicarboxylic acid, diphenyl dicarboxylic acid, diphenyl ether dicarboxylic acid, diphenylethane dicarboxylic acid, cyclohexane dicarboxylic acid, adipic acid and sebacic acid, and alkyl-, alkoxy- or halogen-substituted compounds thereof. These dicarboxylic acid compounds can also be used for polymerization in the form of ester-formable derivatives, for example, lower alcohol esters such as a dimethyl ester.

Then, examples of the dihydroxy compound constituting the thermoplastic polyester resin (A) of the present invention include hydroxy compounds such as ethylene glycol, propylene glycol, butane diol, neopentyl glycol, hydroquinone, resorcin, dihydroxyphenyl, naphthalene diol, dihydroxyphenyl ether, cyclohexane diol, 2,2-bis(4-hydroxyphenyl) propane and diethoxylated bisphenol A, polyoxyalkylene glycol and alkyl-, alkoxy- or halogen-substituted compounds thereof, and one or more of them can be added. Examples of the oxycarboxylic acid compound include oxycarboxylic acids such as oxybenzoic acid, oxynaphthoic acid and diphenyleneoxycarboxylic acid, and alkyl-, alkoxy- or halogen-substituted compounds thereof. Further, ester-formable derivatives of these compounds can also be used. In the present invention, one or more of these compounds are used. In addition to the above-described compounds, polyesters having a branched or cross-linked structure obtained by using a small amount of a trifunctional monomer, such as, trimellitic acid, trimesic acid, pyromellitic acid, pentaerythritol and trimethylolpropane, may be used.

In the present invention, any of thermoplastic polyesters produced by polycondensation using the above-described compounds as monomer components, can be used as the component (A) of the present invention, and they are used alone or in combination of two or more. Preferably, is used a polyalkylene terephthalate, further preferably a polybutylene terephthalate and copolymers including such terephthalate as the main component. In the present invention, thermoplastic polyesters may be modified according to a known method such as cross-linking and graft polymerization.

Representative examples of the impact resistance giving agent (B) used in the present invention, thermoplastic elastomers and core-shell polymers are cited. These thermoplastic elastomers are a generic name of the polymer substances which can be melt-mixed with thermoplastic polyester resins because they are solids having rubber-like elasticity at normal temperature, but heating them decreases the viscosity thereof.

The kind of the thermoplastic elastomer is not particularly restricted, and olefin-, styrene-, polyester-, polyamide- and urethane-based elastomers are listed, for example.

Preferable as the olefin-based elastomer are copolymers mainly comprising ethylene and/or propylene, and specific examples thereof include, but are not limited to, an ethylene-propylene copolymer, ethylene-butene copolymer, ethylene-octene copolymer, ethylene-propylene-butene copolymer, ethylene-propylene-diene copolymer, ethylene-ethyl acrylate copolymer, ethylene-vinyl acetate copolymer and ethylene-glycidyl methacrylate copolymer. Among the olefin-based elastomers, preferably used are graft copolymers obtained by chemically bonding, either in branched or cross-linked structure, (a-1) an ethylene-unsaturated alkyl carboxylate copolymer or (a-2) an olefin-based copolymer composed of an α-olefin and a glycidyl ester of an α, β-unsaturated acid with one or more of (b) a polymer or copolymer mainly comprising a repeating unit represented by the following general formula (1):

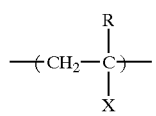

(1)

(wherein, R represents hydrogen or a lower alkyl group, X represents one or more groups selected from —COOH, —COOCH$_3$, —COOC$_2$H$_5$, —COOC$_4$H$_9$, —COOCH$_2$CH(C$_2$H$_5$) C$_4$H$_9$,

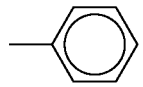

and —CN.)

Such graft copolymer particularly has an effect for improving heat shock property, and is particularly suitable as the impact resistance giving agent. Specific examples of the ethylene-unsaturated alkyl carboxylate copolymer (a-1) include random copolymers such as an ethylene-acrylic acid copolymer, ethylene-methacrylic acid copolymer, ethylene-acrylic acid-ethyl acrylate copolymer, ethylene-ethyl acrylate copolymer, ethylene-vinyl acetate copolymer and ethylene-vinyl acetate-ethyl acrylate copolymer, and further, these copolymer can also be mixed for use. As α-olefin which is one monomer constituting the olefin-based copolymer (a-2), ethylene, propylene and butene-1 are listed, and ethylene is preferably used. The glycidyl ester of an α, β-unsaturated acid which is another monomer constituting the component (a-2) is a compound represented by the following general formula (2), and examples thereof include glycidyl acrylate, glycidyl methacrylate and glycidyl ethacrylate, and particularly glycidyl methacrylate is preferably used.

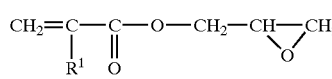

(2)

(wherein, R$^1$ represents hydrogen or a lower alkyl group.) An α-olefin (for example, ethylene) and a glycidyl ester of an α, β-unsaturated acid can be copolymerized usually by a well-known radical polymerization reaction to obtain a copolymer (a-2). The segment (a-2) is suitably constituted of 70 to 99% by weight of α-olefin and 30 to 1% by weight of a glycidyl ester of an α, β-unsaturated acid.

Then, the polymer or copolymer (b) to be graft-polymerized with the olefin-based copolymer (a-1) or (a-2) is a homopolymer constituted of one of the repeating unit represented by the general formula (1) or a copolymer constituted of two or more repeating units represented by the general formula (1). Examples thereof include polymethyl methacrylate, polyethyl acrylate, polybutyl acrylate, poly2-ethylhexyl acrylate, polystyrene, polyacrylonitrile, acrylonitrile-styrene copolymer, butyl acrylate-methyl methacrylate copolymer and butyl acrylate-styrene copolymer, and a butyl acrylate-methyl methacrylate copolymer is particularly preferable. These polymers or copolymers (b) are also prepared by radical polymerization of corresponding vinyl-based monomers.

The graft copolymer used in the present invention has its feature that the above-described olefin-based copolymer (a-1) or (a-2) or the (co)polymer (b) is not used alone but it is a graft copolymer having a branched or cross-linked structure in which the copolymer (a-1) or (a-2) is chemically bonded with the (co)polymer (b) at least via one point, and, by forming a graft structure, a remarkable effect can be obtained as describe later which is not obtained simply by compounding the component (a-1), (a-2) or (b) alone. Here, it is suitable that the ratio of the component (a-1) or (a-2) to (b) for constituting a graft copolymer is from 95:5 to 5:95 (by weight), preferably from 80:20 to 20:80.

The production of the graft copolymer used in the present invention may be conducted by any generally well-known method such as a chain transfer method and an ionizing radiation irradiating method. However, most preferable is a grafting reaction of polymers each other, in which a grafted precursor, prepared by copolymerizing a monomer of the component (b) with a radical (co)polymerizable organic peroxide is melt kneaded in a main chain component particle. The reason for this is that grafting efficiency is high and secondary coagulation by heat does not occur, leading more effective manifestation of abilities.

As the styrene-based elastomer, block copolymers composed of a polymer block mainly comprising a vinyl aromatic compound such as styrene and a polymer block mainly comprising a conjugated diene compound not hydrogenated and/or hydrogenated are listed. The vinyl aromatic compound constituting such block copolymer is at least one member selected from the group consisting of styrene, α-methylstyrene, vinyltoluene, p-tert butylstyrene, divinylenzene, p-methylstyrene and 1,1-diphenylstyrene, and among them, styrene is preferable. The conjugated diene compound is at least one member selected from the group consisting of butadiene, isoprene, 1,3-pentadiene, 2,3-dimethyl-1,3-butadiene, pyrelyrene, 3-butyl-1,3-octadiene, phenyl-1,3-butadiene, and among them, butadiene, isoprene and combinations thereof are preferable. The block copolymer herein referred to is a block copolymer composed of a polymer block A mainly comprising a vinyl aromatic compound and a polymer block B mainly comprising a conjugated diene compound, and the copolymerization ratio of the vinyl aromatic compound to the conjugated diene compound is from 5/95 to 70/30, particularly preferably from 10/90 to 60/40.

The number-average molecular weight of the block copolymer used in the present invention is in the range from 5000 to 600000, preferably from 10000 to 500000, and the molecular weight distribution [ratio of weight-average molecular weight (Mw) to number-average molecular weight (Mn)] is 10 or less. The molecular structure of the block copolymer maybe any of linear, branched, radial, or combinations thereof. Examples thereof include vinyl aromatic compound-conjugated diene compound block copolymers having a structure such as A-B-A, B-A-B-A, (A-B-)$_4$Si and A-B-A-B-A. Further, the unsaturated bond of the conjugated diene compound of the block copolymer may be partially hydrogenated.

As the method for producing the block copolymer used in the present invention, any can be adopted providing a copolymer having the above-described structure is obtained. For example, according to methods described in JP-B Nos. 40-23798, 43-17979 and 56-28925, vinyl aromatic compound-conjugated diene compound block copolymers can be synthesized in an inert solvent using a lithium catalyst and the like. Further, according to methods described in JP-B Nos. 42-8704, 43-6636 and 59-133203, hydrogenation can be conducted in the presence of a hydrogenation catalyst in an inert solvent to obtain partially hydrogenated block copolymers to be used in the present invention.

The above-described block copolymer can be epoxidized to obtain an epoxy-modified block copolymer usable in the present invention. The epoxy-modified block copolymer in the present invention can be obtained by reacting the above-described block copolymer with an epoxydizing agent such as hydroperoxides and peracids, in an inert solvent. The hydroperoxides include hydrogen peroxide, tertiary butyl hydroperoxide and cumene peroxide. The peracids include performic acid, peracetic acid, perbenzoic acid and pertrifluoroacetic acid. Among them, peracetic acid is a preferable epoxidizing agent because it is produced industrially in large amount, available cheaply, and highly stable.

A catalyst can be used if necessary in the epoxidation. For example, in the case of a peracid, an alkali such as sodium carbonate and an acid such as sulfuric acid can be used as the catalyst. Further, in the case of hydroperoxides, a mixture of tungstic acid with sodium hydroxide can be used together with hydrogen peroxide, or molybdenum hexacarbonyl can be used together with tertiary butyl hydroperoxide to obtain catalytic effect. The amount of the epoxidizing agent is not regulated strictly, and the optimum amount in each case is determined by a variable factor such as each epoxidizing agent used, degree of epoxidation desired and each block copolymer used.

The inert solvent can be used for the purpose of reducing the viscosity of a raw material, stabilizing an epoxidizing agent by dilution, and the like. In the case of a peracetic acid, aromatic compounds such as ethers and esters can be used. Particularly preferable solvents are hexane, cyclohexane, toluene, benzene, ethyl acetate, carbon tetrachloride and chloroform. The epoxidation reaction condition is not strictly regulated. The reaction temperature range which can be used is determined by the reactivity of an epoxidizing agent used. For example, in the case of a peracetic acid, the reaction temperature is preferably from 0 to 70° C. At 0° C. or lower, the reaction is slow, and at 70° C. or higher, decomposition of the peracetic acid occurs. In the tertiary butyl hydroperoxide/molybdenum dioxide diacetyl acetate system which is one example of hydroperoxide, a preferable temperature range is from 20 to 150° C. due to the same reason. Specific treatment of the reaction mixture is not required, and for example, the mixture may advantageously be stirred for 2 to 10 hours. Isolation of the resulted epoxy-modified copolymer can be conducted by a suitable method, for example, a method in which precipitation is effected from a poor solvent, a method in which a polymer is put into hot water with stirring and the solvent is removed by distillation and a method in which a solvent is removed directly.

The epoxy equivalent of the above-described epoxy-modified block copolymer is preferably from 140 to 2700 g/mol, and particularly preferably from 200 to 2000 g/mol. When the epoxy equivalent is over 2700 g/mol, compatibility is not sufficient, and phase separation tends to occur. On the other hand, when less than 140 g/mol, particularly a side reaction of a gelled substance and the like tends to occur in isolation of a polymer, undesirably.

Examples of the polyester-based elastomer include, but are not limited to, block copolymers comprising a hard segment composed of an aromatic polyester such as polyethylene terephthalate and polybutylene terephthalate, and a soft segment composed of a polyether such as polyethylene glycol and polytetramethylene glycol or of an aliphatic polyester such as polyethylene adipate, polybutylene adipate and polycaprolactone.

Examples of the polyamide-based elastomer include, but are not limited to, block copolymers composed of a hard segment comprising nylon 6, nylon 66, nylon 11 or nylon 12 and a soft segment comprising a polyether or an aliphatic polyester.

Examples of the urethane-based elastomer include, but are not limited to, block copolymers comprising a hard segment composed of a polyurethane obtained by reacting a diisocyanate such as 4,4'-diphenylmethane diisocyanate, 4,4'-dicyclohexylmethane diisocyanate, tolylene diisocyanate and hexamethylene diisocyanate with a glycol such as ethylene glycol and tetramethylene glycol, and a soft segment composed of a polyether such as polyethylene glycol, polypropylene glycol and polytetramethylene glycol or of an aliphatic polyester such as polyethylene adipate, polybutylene adipate and polycaprolactone.

On the other hand, the core shell polymer is a core shell type graft copolymer having a multi-layer structure and preferably in which a rubber layer having an average particle size of 1.0 μm or less is wrapped with a vitreous resin. The rubber layer of the core shell type copolymer has an average particle size of 1.0 μm or less, and preferable range is from 0.2 to 0.6 μm. If the average particle size of the rubber layer is over 1.0 μm, the effect for improving shock resistance property may be insufficient. As the rubber layer of this core shell type copolymer, those obtained by copolymerization/graft copolymerization of a silicon-based, diene-based or acrylic elastomer singly or two or more elastomer components selected from them can be used.

The silicon-based elastomer is produced by polymerizing an organosiloxane monomer, and examples of the organosiloxane used include hexamethyltricyclosiloxane, octamethylcyclosiloxane, decamethylpentacyclosioxane, decamethylhexacyclosiloxane, trimethyltriphenylsiloxane, tetramethylphenylcyclotetrasiloxane and octaphenylcyclotetrasiloxane. The acrylic rubber is obtained by polymerizing an acrylate such as butyl acrylate and a small amount of cross-linkable monomer such as butylene diacrylate.

As the above-described acrylate, methyl acrylate, ethyl acrylate, propyl acrylate, hexyl acrylate and 2-ethylhexyl acrylate are listed, in addition to butyl acrylate. As the cross-linkable monomer, esters of polyol and acrylic acid such as butylene dimethacrylate and trimethylolpropane, in addition to butylene diacrylate, vinyl compounds such as divinylbenzene, vinyl acrylate and vinyl methacrylate, and allyl compounds such as allyl acrylate, allyl methacrylate, diallyl malate, diallyl fumarate, diallyl itanylate, monoallyl malate, monoallyl fumarate and triallyl cyanurate. An example of the diene-based rubber includes a polybutadiene obtained by polymerizing a butadiene monomer.

For the shell layer formed with a vitreous resin of the core shell type copolymer, a vinyl-based copolymer is used. The vinyl-based polymer is obtained by polymerizing or copolymerizing at least one monomer selected from the group aromatic vinyl monomers, vinyl cyanide monomer, methacrylate monomers and acrylate monomers. The rubber and shell layers of such a core shell type copolymer are usually bonded by graft copolymerization. This graft copolymerization is accomplished by, if necessary, adding a graft crossing agent, which reacts with the shell layer in polymerizing the rubber layer, to impart a reactive group to the rubber layer, then, by forming the shell layer. As the graft crossing agent, in the case of the silicone-based rubber, an organosiloxane having a vinyl bond or an organosiloxane having a thiol is used. Preferably, acryloxysiloxane, methacryloxysiloxane and vinylsiloxane are used.

Examples of the core shell polymer as described above include Kane Ace FM manufactured by Kaneka Corp., Metabrene W-300, W-530, S-2001manufactured by Mitsubishi Rayon Co., Ltd., Acryloid KM-323, KM-330 manufactured by Rohm & Haars, Paraloid EXL-2311,-2602,-3211 manufactured by Kureha Chemical Industry Co., Ltd., and Staphyloid P-3267 manufactured by Takeda Chemical Industry Ltd. (all are trade marks).

The amount compounded of the impact resistance giving agent of the component (B) in the present invention is from 1 to 25% by weight in the whole composition, and preferably from 2 to 20% by weight, further preferably from 3 to 15% by weight. When the amount of the component (B) is too low, high heat shock property intended by the present invention is not obtained, and when too high, mechanical properties such as rigidity are undesirably disturbed. The impact resistance giving agent can be used alone or in combination of two or more.

The inorganic filler of the component (C) used in the present invention is an essential component for the purpose of reducing the molding shrinkage coefficient and linear expansion coefficient of a molded article and improving high and low heat shock property, and various fillers in the form of fiber or non-fiber (e.g., powder, plate) are used depending on the object. As fibrous filler of these fillers, glass fiber, glass fiber having a non-circular cross section such as flat fiber, asbestos fiber, carbon fiber, silica fiber, silica alumina fiber, zirconia fiber, boron nitride fiber, silicon nitride fiber, boron fiber, potassium titanate fiber, and further, metal fibrous substances such as stainless, aluminum, titanium, copper and brass. Particularly, the typical fibrous filler is glass fiber or carbon fiber. On the other hand, as the powdery filler, carbon black, silica, quartz powder, glass bead, glass powder, calcium silicate, kaolin, talk, clay, diatomaceous earth, silicates such as wollastonite, metal oxides such as iron oxide, titanium oxide, zinc oxide and alumina, metal carbonates such as calcium carbonate and magnesium carbonate, metal sulfates such as calcium sulfate and barium sulfate, and in addition, silicon carbide, silicon nitride, boron nitride and various metal powders are cited. As the plate-like filler, mica, glass flake and various metal foils are listed. These inorganic fillers can be used alone or in combination of two or more. When these inorganic fillers are used, they are desirably treated previously with a sizing agent or surface treatment agent, if necessary.

The amount compounded of the inorganic filler (C) in the present invention is from 1 to 50% by weight in the whole composition, and preferably from 10 to 45% by weight, further preferably from 20 to 40% by weight. When the amount is too low, the effect for improving heat shock resistance is low, and when too high, molding work becomes difficult.

The aromatic polyvalent carboxylate (D) used in the present invention is a component represented by the following general formula:

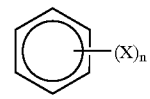

(wherein, X represents —COOR, R represents an alkyl group, n is an integer from 2 to 4, and Rs on respective Xs may be the same or different.)

Particularly when n is 3 or more, heat resistance is high, more preferably. As the component (D), for example, trimellitate and pyromellitate are listed as preferable examples. As the alkyl group constituting this alkyl ester, trioctyl group, triisodecyl group, tris(2-ethylhexyl) group and tributyl group are listed, and the above-described alkyl ester is constituted of at least one of these alkyl groups. These aromatic polyvalent carboxylates can be used alone or in combination.

The amount compounded of the aromatic polyvalent carboxylate (D) in the present invention is from 0.1 to 10% by weight in the composition, and preferably from 0.5 to 7% by weight, particularly preferably from 1 to 5% by weight. When the amount is too low, heat shock property is not sufficient, and when too high, problems occur nonpreferably such as deterioration of physical properties, e.g., rigidity, and bleeding of an aromatic ester onto the surface of a molded article.

In the present invention, other thermoplastic resin components can also be used accessorily in a small amount, in addition to the above-described components, depending on the object. The other thermoplastic resin herein used may be any resin providing it is stable at higher temperatures. For example, polyamides, polycarbonates, polyphenylene sulfide, polyphenylene oxide, polyacetal, acrylonitrile-styrene resin, acrylonitrile-butadien-styrene resin, polysulfone, polyether sulfone, polyether imide, polyether ketone and fluorine resins. These thermoplastic resins can also be used in combination of two or more.

Further, in the resin composition of the present invention, there can be compounded known substances, which is generally added to thermoplastic resins and thermosetting resins, namely, stabilizers such as antioxidant and ultraviolet ray absorber, antistatic agent, coloring agents such as dye and pigments, lubricants, releasing agents and crystallization promoters, and crystal nucleators, for the purpose of imparting desired properties corresponding to the object.

The composition of the present invention is prepared easily by known facilities and methods generally used for preparing conventional resin compositions. Any method can be used. For example, i) a method in which the components are mixed, the mixture is kneaded and extruded by an extruder to prepare pellets, and then, the pellets are molded, ii) a method in which a pellet having different composition is once prepared, the pellets are mixed in given amount and subjected to molding, to obtain a molded article having the intended composition after the molding, and iii) a method in which one or more of respective components are directly charged into a molding machine. Further, it is preferable that a part of resin components is made into a fine powder, and is added and mixed with other components, for attaining uniform compounding of these components.

The insert molded article referred to in the present invention is a composite molded article obtained by charging previously a metal and the like into a metal mold for molding, and filling the above-described resin composition onto the outside thereof. For filling a resin in a mold, there are an injection molding method, extrusion molding method, compression molding method and the like, and an injection molding method is general. Since the material inserted into a resin is used for the purpose of compensating defects of the resin while utilizing the properties thereof, those which are not deformed and not melted when come into contact with the resin are used. Therefore, those which mainly comprises metals such as aluminum, magnesium, copper, iron, brass and alloys thereof or inorganic solids such as glass and ceramics, and which are previously molded into bars, pins, screws and the like, are used.

Effect of the Invention

As described above, the composition of the present invention is extremely excellent in heat shock property, and an insert molded article molded using this composition can endure high and low temperature change for a long period of time, and is suitably used for automobile parts, particularly parts around an engine.

EXAMPLES

The following examples further illustrate the present invention in detail but do no limit the scope thereof.

The evaluation of the heat shock property was conducted as follows. That is, pellets of a resin composition were insert-injection-molded into a mold for specimen (a mold having a prism of length 22 mm, width 22 mm and height 51 mm into which an iron core of length 18 mm, width 18 mm and height 30 mm is inserted) at a cylinder temperature of 250° C., a mold temperature of 70° C., an injection time of 20 seconds and a cooling time of 10 seconds, so that the minimum thickness of some resin portions was 1 mm, to produce an insert molded article (hereinafter, named as test piece). After molding, the test piece was heated at 140° C. for 1.5 hours using a heat shock chamber, then, cooled down to - 40° C. and kept for 1.5 hours, then, heated to 140° C. again. The heat shock test was conducted in which the above-mentioned heat, cool and heat steps were effected as one cycle. The numbers of the cycle until cracking occurred in 10 test pieces were measured, and the average was regarded as heat shock life, and heat shock property was evaluated. Higher value of the heat shock life indicates higher heat shock property.

Examples 1 to 18 and Comparative Examples 1 to 10

Components (A) to (D) having compositions shown in Tables 1 to 3 were melted and kneaded by an extruder to obtain pellets. Then, the heat shock property was evaluated as described above. The evaluation results are summarized in Tables 1 to 3.

The details of the components used are as shown below.

(A) Thermoplastic Polyester Resin

Polybutylene terephthalate (PBT); intrinsic viscosity 0.75, manufactured by Polyplastics Co., Ltd.

(B) Impact resistance giving agent (B1) Thermoplastic elastomer resin (E/EA-g-BA/MMA); Graft copolymer of 70 parts by weight of ethylene-ethyl acrylate copolymer and 30 parts by weight of methyl methacryalte-butyl acrylate copolymer; manufactured by NOF Corp., trade name: Modiper A5300

(B2) Acrylic core shell polymer; manufactured by Kureha Chemical Industry Co., Ltd., trade name: Paraloid EXL-2311

(B3) Ethylene-ethyl acrylate copolymer (E/EA); manufactured by Nippon Unicar Co., Ltd., trade name: Eveflex EEA A713

(B4) Methyl methacrylate-butadiene-styrene copolymer resin (MBS); manufactured by Kureha Chemical Industry Co., Ltd., trade name: Paraloid EXL-2602

(B5) Thermoplastic elastomer resin (EGMA-g-MMA); Graft copolymer of 70 parts by weight of ethylene-glycidyl methacrylate (85:15) copolymer and 30 parts by weight of methyl methacryalte copolymer; manufactured by NOF Corp., trade name: Modiper A4200

(B6) Epoxy-modified styrene-butadiene-styrene block copolymer (ESBS); manufactured by Daicel Chemical Industries, Ltd., trade name: Epofriend A1010

(C) Inorganic filler (C1) Glass fiber (diameter: 10 $\mu$m)

(C2) Glass flake (thickness: about 3 $\mu$m, median particle size: about 300 $\mu$m)

(D) Aromatic polyvalent carboxylate (D1) Alkyl trimellitate; manufactured by Daihachi Chemical Industry Co., Ltd., trade name: TOTM (D2) Alkyl pyromellitate; manufactured by Asahi Denka Kogyo K.K., trade name: Adekasizer UL-100

TABLE 1

| | | Example | | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 | 13 |
| Composition (wt %) | (A) PBT | 62 | 60 | 62 | 59 | 57 | 59 | 57 | 57 | 57 | 62 | 62 | 57 | 57 |
| | (B1) E/EA-g-BA/MMA | 5 | 5 | 5 | 10 | 10 | 10 | 10 | 10 | 10 | | | | |
| | (B2) Core shell polymer | | | | | | | | | | 5 | 5 | 10 | 10 |
| | (B3) E/EA | | | | | | | | | | | | | |
| | (B4) MBS | | | | | | | | | | | | | |
| | (B5) EGMA-g-MMA | | | | | | | | | | | | | |
| | (B6) ESBS | | | | | | | | | | | | | |
| | (C1) Glass fiber | 30 | 30 | 30 | 30 | 30 | 30 | 30 | | | 30 | 30 | 30 | 30 |
| | (C2) Glass flake | | | | | | | | 30 | 30 | | | | |
| | (D1) Trimellitate | 3 | 5 | | 1 | 3 | | | 3 | | 3 | | 3 | |
| | (D2) Pyromellitate | | | 3 | | | 1 | 3 | | 3 | | 3 | | 3 |
| Heat shock life (cycle) | | 285 | 314 | 292 | 302 | 350 | 310 | 355 | 295 | 303 | 315 | 330 | 390 | 398 |

TABLE 2

| | | Example | | | | |
|---|---|---|---|---|---|---|
| | | 14 | 15 | 16 | 17 | 18 |
| Composition (wt %) | (A) PBT | 62 | 62 | 62 | 62 | 57 |
| | (B1) E/EA-g-BA/MMA | | | | | 10 |

TABLE 2-continued

|  |  | Example | | | | |
|---|---|---|---|---|---|---|
|  |  | 14 | 15 | 16 | 17 | 18 |
| (B2) Core shell polymer |  |  |  |  |  |  |
| (B3) E/EA |  | 5 |  |  |  |  |
| (B4) MBS |  |  | 5 |  |  |  |
| (B5) EGMA-g-MMA |  |  |  | 5 |  |  |
| (B6) ESBS |  |  |  |  | 5 |  |
| (C1) Glass fiber |  | 30 | 30 | 30 | 30 | 15 |
| (C2) Glass flake |  |  |  |  |  | 15 |
| (D1) Trimellitate |  |  |  |  |  |  |
| (D2) Pyromellitate |  | 3 | 3 | 3 | 3 | 3 |
| Heat shock life (cycle) |  | 280 | 254 | 301 | 290 | 328 |

TABLE 3

|  |  | Comparative Example | | | | | | | | | |
|---|---|---|---|---|---|---|---|---|---|---|---|
|  |  | 1 | 2 | 3 | 4 | 5 | 6 | 7 | 8 | 9 | 10 |
| Composition (wt %) | (A) PBT | 70 | 65 | 60 | 65 | 67 | 67 | 65 | 65 | 65 | 65 |
|  | (B1) E/EA-g-BA/MMA |  | 5 | 10 |  |  |  |  |  |  |  |
|  | (B2) Core shell polymer |  |  |  | 5 |  |  |  |  |  |  |
|  | (B3) E/EA |  |  |  |  |  |  | 5 |  |  |  |
|  | (B4) MBS |  |  |  |  |  |  |  | 5 |  |  |
|  | (B5) EGMA-g-MMA |  |  |  |  |  |  |  |  | 5 |  |
|  | (B6) ESBS |  |  |  |  |  |  |  |  |  | 5 |
|  | (C1) Glass fiber | 30 | 30 |  | 30 | 30 | 30 | 30 | 30 | 30 | 30 |
|  | (C2) Glass flake |  |  | 30 |  |  |  |  |  |  |  |
|  | (D1) Trimellitate |  |  |  |  | 3 |  |  |  |  |  |
|  | (D2) Pyromellitate |  |  |  |  |  | 3 |  |  |  |  |
| Heat shock life (cycle) |  | 40 | 161 | 131 | 170 | 85 | 90 | 135 | 120 | 165 | 159 |

As shown in Table 3, comparison of Comparative Example 1 with Comparative Examples 2 to 4 and 7 to 10 teaches that heat shock property is improved by addition of an impact resistance giving agent, and comparison of Comparative Example 1 with Comparative Examples 5 and 6 teaches that heat shock property is improved to a certain extent also by addition of an aromatic polyvalent carboxylate. On the other hand, as apparent from examples shown in Tables 1 and 2, when an impact resistance giving agent and an aromatic polyvalent carboxylate are used together, higher heat shock property is obtained which is far higher than expected from respective heat shock property-improving effects.

What is claimed is:

1. A polyester resin composition comprising:

(A) 30 to 87% by weight, based on the total amount of the composition, of a thermoplastic polybutylene terephthalate resin, (B) 2 to 20% by weight, based on the total amount of the composition, of an impact resistance agent, (C) 10 to 45% by weight, based on the total amount of the composition, of an inorganic filler which is one selected from the group consisting of glass fibers and glass flakes, and (D) 1 to 5% by weight, based on the total amount of the composition, of an aromatic polyvalent carboxylate which is at least one substance selected from the group consisting of trimellitate and pyromellitate.

2. The composition of claim 1, wherein the impact resistance agent (B) is at least one substance selected from the group consisting of thermoplastic elastomers and core shell polymers.

3. The composition of claim 2, wherein the thermoplastic elastomer is at least one member selected from the group consisting of olefin-, styrene-, polyester-, polyamide- and urethane-based elastomers.

4. The composition of claim 1, wherein the impact resistance agent (B) is a graft copolymer in which a copolymer of ethylene with an alkyl unsaturated carboxylate is chemically bonded either in a branched or cross-linked structure with at least one polymer or copolymer mainly constituted from a repeating unit represented by the following formula (1):

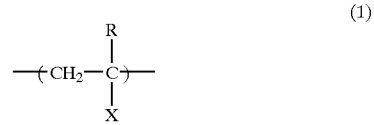

wherein R is hydrogen or a lower alkyl group; and X is at least one group selected from —COOH, —COOCH$_3$, —COOC$_2$H$_5$, —COOC$_4$H$_9$, —COOCH$_2$CH(C$_2$H$_5$)C$_4$H$_9$,

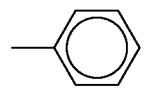

and —CN.

5. An insert molded article which includes:
a molded polyester resin composition comprised of:

(A) 30 to 87% by weight, based on the total amount of the composition, of a thermoplastic polybutylene terephthalate resin, (B) 2 to 20% by weight, based on the total amount of the composition, of an impact resistance agent, (C) 10 to 45% by weight, based on the total amount of the composition, of an inorganic filler which is one selected from the group consisting of glass fibers and glass flakes, and (D) 1 to 5% by weight, based on the total amount of the composition, of an aromatic polyvalent carboxylate which is at least one substance selected from the group consisting of trimellitate and pyromellitate; and an insert member formed of a metal or an inorganic solid inserted into said molded polyester resin composition.

6. The insert molded article of claim 5, wherein the impact resistance agent (B) is at least one substance selected from the group consisting of thermoplastic elastomers and core shell polymers.

7. The insert molded article of claim 6, wherein the thermoplastic elastomer is at least one member selected from the group consisting of olefin-, styrene-, polyester-, polyamide- and urethane-based elastomers.

8. The insert molded article of claim 5, wherein the impact resistance agent (B) is a graft copolymer in which a copolymer of ethylene with an alkyl unsaturated carboxylate is chemically bonded either in a branched or cross-linked structure with at least one polymer or copolymer mainly constituted from a repeating unit represented by the following formula (1):

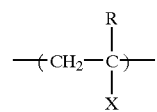
(1)

wherein R is hydrogen or a lower alkyl group; and X is at least one group selected from —COOH, —COOCH$_3$, —COOC$_2$H$_5$, —COOC$_4$H$_9$, —COOCH$_2$CH(C$_2$H$_5$)C$_4$H$_9$,

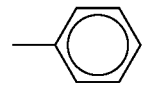

and —CN.

* * * * *